A. SARTOR.
FENDER LAMP FOR AUTOMOBILES.
APPLICATION FILED FEB. 8, 1917.

1,263,606.

Patented Apr. 23, 1918.

Witness
F.C. Harrold.

Inventor
A. SARTOR

By Fisher & Moser
Attorneys

UNITED STATES PATENT OFFICE.

ALPHONSE SARTOR, OF SANDUSKY, OHIO.

FENDER-LAMP FOR AUTOMOBILES.

1,263,606.  Specification of Letters Patent.  Patented Apr. 23, 1918.

Application filed February 8, 1917. Serial No. 147,298.

*To all whom it may concern:*

Be it known that I, ALPHONSE SARTOR, citizen of the United States, residing at Sandusky, in the county of Erie and State of Ohio, have invented certain new and useful Improvements in Fender-Lamps for Automobiles, of which the following is a specification.

This invention comprises a fender lamp for automobiles, embodying the features of construction substantially as herein shown and described and more particularly pointed out in the claims.

The object of the invention is to provide a simple and effective signal lamp adapted to be secured to the fenders of an automobile, whereby the intention of the driver of the vehicle to turn in either direction may be signaled to others on the road.

Figure 1:
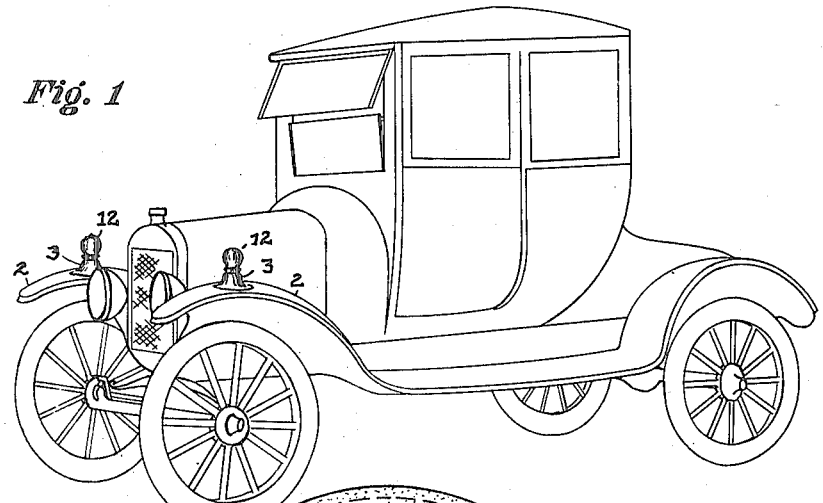

In the accompanying drawings, Figure 1 is a perspective view of an automobile having a pair of the signal lamps mounted on its front fenders, although these lamps may also be placed on the rear fenders.

Figure 2:
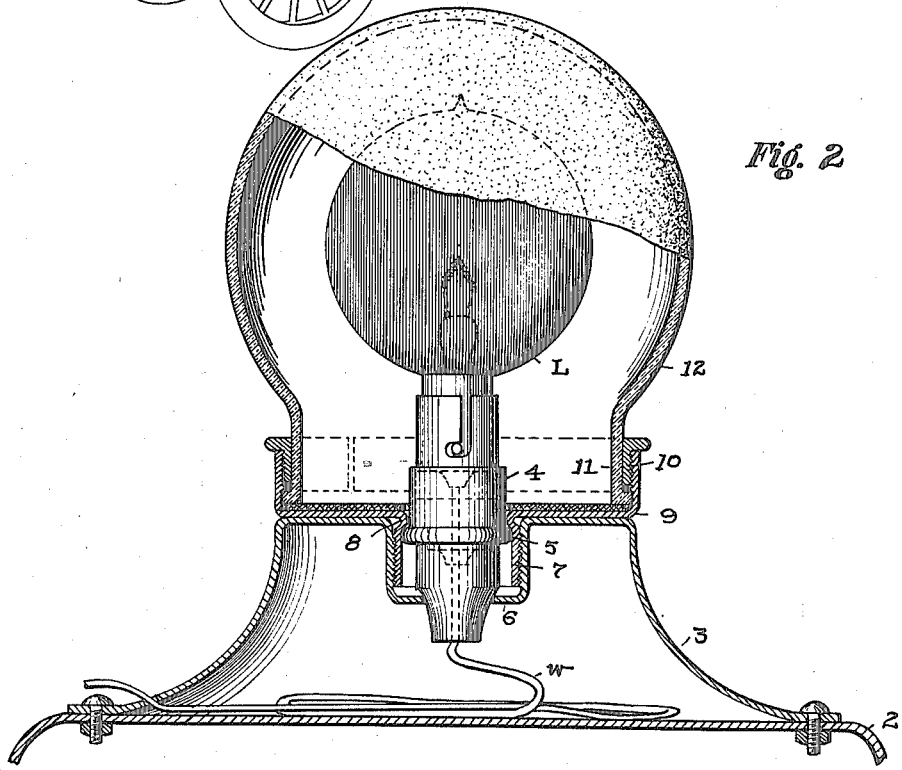

Fig. 2 is a sectional view of a portion of a fender and my improved lamp affixed thereto.

The fender 2 may be of any shape and the lamp is seated upon the top of the fender, having a flaring sheet metal base 3 adapted to shed water easily and secured to the fender 2 by bolts and nuts or in any suitable way.

An electric lamp socket 4 having an annular flange 5 is seated in fixed engagement centrally within the open bottom of an internally screw-threaded cup or boss 6 which is projected downwardly from the flat top of base 3 and is of sufficient diameter and depth to place the flanged portion 5 of the socket at a lower elevation than the plane of said top so that said flange may be encompassed by the tubular externally-threaded extension 7 when screwed into boss 7. An internal bead or reduced neck 8 at the upper end of extension 7 engages the flange 5 to hold the socket rigidly in place and upright, and the extension 7 is formed as an integral part of a dished member 9 adapted to seat flush upon the top face of base 3. The annular flange 10 of member 9 is screw-threaded internally to receive a split screw-ring 10 which is sleeved about the beaded neck 11 of a white frosted glass globe 12, in this way clamping the globe removably in place within member 9, and a yielding lining of rubber or other material may be used to sustain the glass globe if desired. Globe 12 is frosted or stippled and more or less translucent, and covers a red signal bulb or electric lamp L which is removably seated within socket 4, which may be of any standard type, for example an Edi-Swan socket having a bayonet joint connection for the lamp. The frosted translucent globe is very effective in transmitting the red rays of light from the red electric lamp L, its advantage being especially apparent in daytime when the red lamp alone would not be appreciably noticeable if illuminated. The electric wire or wires $w$ are attached to the socket as usual and extend out of an opening in one side of base 3 to the lighting circuit which is under the control of the operator in the car, and the wire $w$ may be coiled to a greater or less extent within the hollow base 3 so that the socket 4 and lamp L may be used as a portable lamp in making repairs or otherwise, and to this end, it is only necessary to unscrew member 9 from base 3, or globe 12 may also be removed. In fact, socket 4 is an independent member which is merely held in place by ring 9, and the assembly and disassembly of the parts is easily effected at all times without disconnecting the wires $w$.

What I claim is:—

1. A fender lamp for automobiles, comprising a base having a central recess in its top, a globe and a holder for said globe in screw engagement with said base, and an electric lamp having a socket therefor removably confined in said recess by said holder.

2. A fender lamp for automobiles, comprising a base having a screw-threaded hollow boss with a central bottom opening, an electric lamp socket seated within said boss, a globe and a holder therefor having a threaded tubular extremity sleeved upon said socket and screwed into said hollow boss, and an electric lamp removably confined within said socket and inclosed within said globe.

3. A fender lamp for automobiles, comprising a base having a central open seat for an electric lamp socket, an electric lamp socket having an annular shoulder externally thereof and removably seated within said open seat, and a locking member for said socket having screw engagement with said base and sleeved in locking engagement with said shoulder.

4. A fender lamp for automobiles, comprising a hollow base having a central hollow boss with a central opening in its bottom, an electric lamp socket removably seated within said boss, an electric lamp within said socket, a glass globe inclosing said lamp and socket, a holder member for said socket screw-engaged with said boss and provided with an annular flange, and a screw ring sleeved upon said globe and screw-engaged with said annular flange.

5. A fender lamp for automobiles, comprising a flaring base having a flat top and a central screw-threaded cup, an electric lamp socket removably seated within said cup, a frosted glass globe and a holder member therefor having a tubular screw extension sleeved over said socket and extending into said cup, and an electric lamp within said socket inclosed by said globe.

6. A fender lamp for automobiles, comprising a hollow flaring base having an internally screw-threaded cup centrally therein, and a dished member having a screw-threaded tubular extension centrally at its bottom adapted to screw into said cup, in combination with an independent electric lamp socket adapted to be removably confined within said cup and extension.

Signed at Cleveland, in the county of Cuyahoga and State of Ohio, this 20th day of January, 1917.

ALPHONSE SARTOR.